(12) United States Patent
Sakuma

(10) Patent No.: US 9,283,943 B2
(45) Date of Patent: Mar. 15, 2016

(54) BRAKE APPARATUS

(75) Inventor: Masaru Sakuma, Kai (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 1152 days.

(21) Appl. No.: 13/238,363

(22) Filed: Sep. 21, 2011

(65) Prior Publication Data

US 2012/0073285 A1 Mar. 29, 2012

(30) Foreign Application Priority Data

Sep. 29, 2010 (JP) ................................. 2010-218921

(51) Int. Cl.
*B60T 13/74* (2006.01)
*B60T 11/232* (2006.01)

(52) U.S. Cl.
CPC ............. *B60T 13/745* (2013.01); *B60T 11/232* (2013.01)

(58) Field of Classification Search
CPC ............................... B60T 13/745; B60T 11/232
See application file for complete search history.

(56) References Cited

U.S. PATENT DOCUMENTS

| | | | | |
|---|---|---|---|---|
| 7,367,187 B2* | 5/2008 | Ikeda et al. | | 60/545 |
| 7,980,638 B2* | 7/2011 | Matsuzaki et al. | | 303/114.1 |
| 8,511,758 B2* | 8/2013 | Sano et al. | | 303/114.1 |
| 2008/0231109 A1* | 9/2008 | Yamada et al. | | 303/20 |
| 2009/0045672 A1* | 2/2009 | Nishino et al. | | 303/113.3 |
| 2009/0115242 A1* | 5/2009 | Ohtani et al. | | 303/3 |
| 2009/0261649 A1* | 10/2009 | Higuma et al. | | 303/113.3 |
| 2010/0275593 A1* | 11/2010 | Okada et al. | | 60/545 |

FOREIGN PATENT DOCUMENTS

JP 2008-239142 10/2008

* cited by examiner

*Primary Examiner* — Edward Look
*Assistant Examiner* — Michael Quandt
(74) *Attorney, Agent, or Firm* — Wenderoth, Lind & Ponack, L.L.P.

(57) ABSTRACT

A brake apparatus, which is configured to generate a hydraulic pressure in a master cylinder, sets a control position of a primary piston. According to a movement of an input piston in response to an operation of a brake pedal, the brake apparatus generates a hydraulic pressure in a primary chamber of the master cylinder by driving the primary piston by an electric motor to supply brake fluid to a brake caliper, thereby exerting a brake effect. The brake apparatus sets a first control position where the primary chamber is out of communication with a reservoir, and a second control position where the primary chamber is in communication with the reservoir as a holding position of the primary piston when no brake is applied. Then, the brake apparatus appropriately switches the holding position of the piston between the first control position and the second control position.

20 Claims, 10 Drawing Sheets

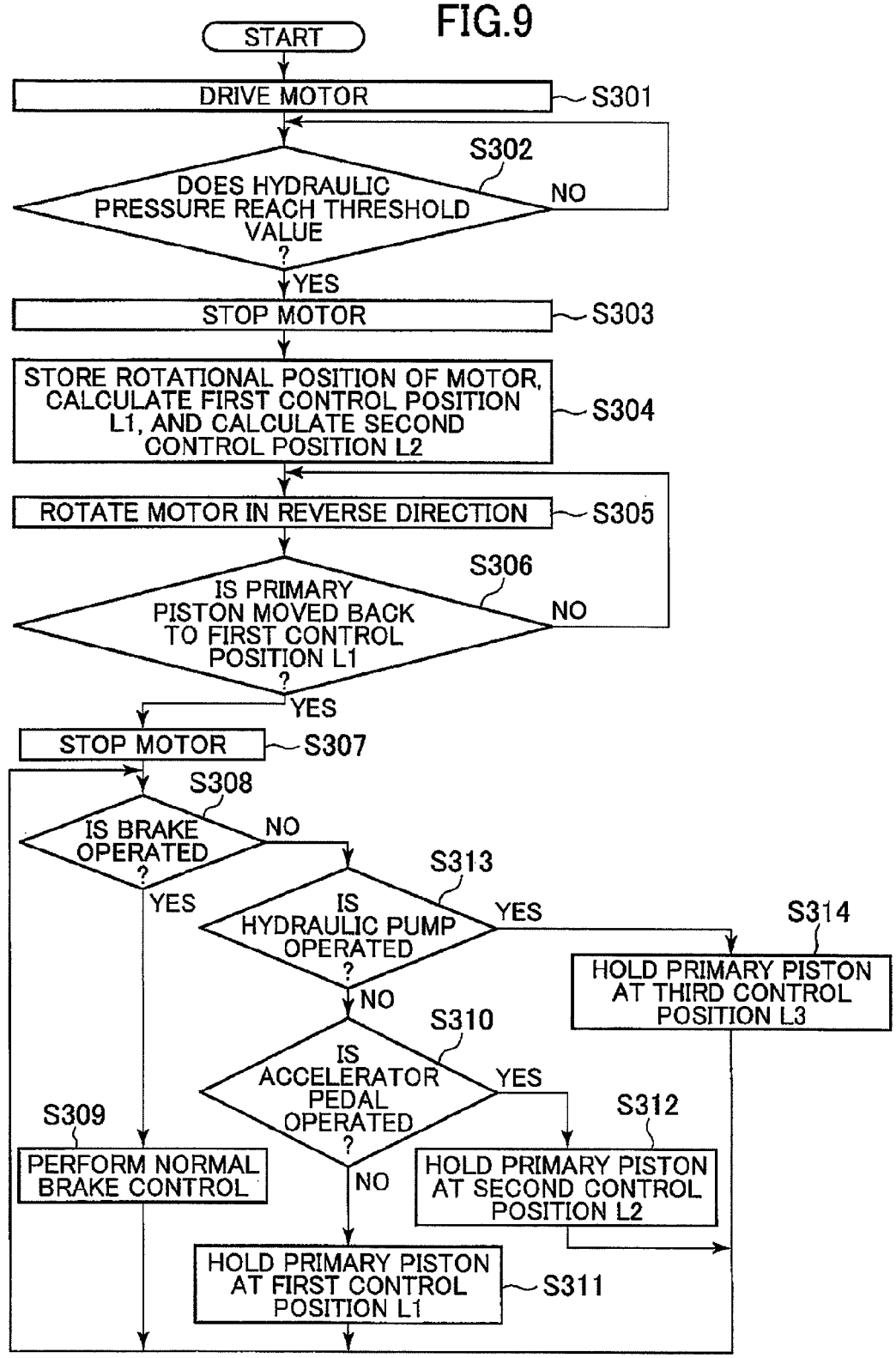

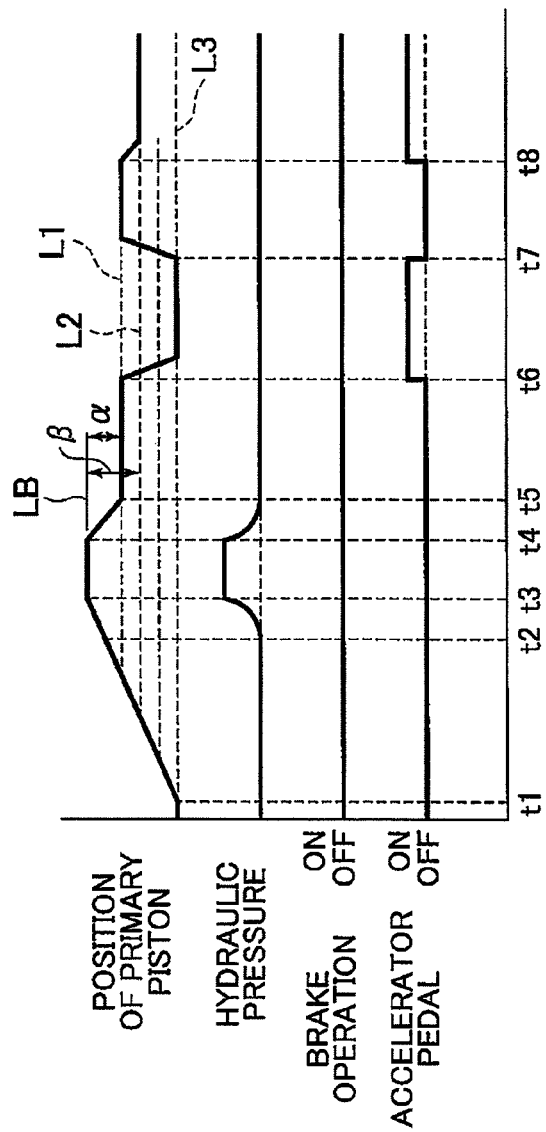

BRAKE APPARATUS

BACKGROUND OF THE INVENTION

The present invention relates to a brake apparatus for use in braking of a vehicle.

As a hydraulic brake apparatus for use in braking a vehicle such as an automobile, for example, there is known a brake apparatus disclosed in Japanese Patent Application Public Disclosure No. 2008-239142. This brake apparatus controls an operation of an electric motor based on relative positions of an input piston, which is coupled with a brake pedal for issuing a brake instruction, and an assist piston, which is configured to be driven by the electric motor, to generate a brake hydraulic pressure in a master cylinder, thereby controlling a brake force. According to this brake apparatus, it is possible to perform various kinds of brake control such as boosting control, brake assist control, and regenerative cooperative control.

This kind of brake apparatus requires accurate setting of a control position, which is a holding position of the assist piston configured to be driven by the electric motor when the brake is released, in order to realize excellent responsiveness of vehicle braking in response to a brake instruction.

SUMMARY OF THE INVENTION

An object of the present invention is to provide a brake apparatus capable of realizing excellent responsiveness of vehicle braking in response to a brake instruction.

To achieve the forgoing and other objects, a brake apparatus according to the present invention includes a reservoir configured to reserve brake fluid, a master cylinder connected to the reservoir and configured to generate a hydraulic pressure in a pressure chamber by cutting off communication between the pressure chamber and the reservoir according to a forward movement of a piston, a booster configured to operate the piston of the master cylinder, a hydraulic pressure detector configured to detect the hydraulic pressure generated in the pressure chamber, and a controller configured to control the booster. The booster includes an input member configured to be moved according to an operation of a brake pedal, an electric actuator configured to drive the piston, and a position detector configured to detect a position of the piston. The controller sets at least two holding positions where the piston is held as a first control position and a second control position based on a reference position. The reference position is set from a position of the piston detected by the position detector when the controller causes the electric actuator to move the piston in a hydraulic pressure generation direction until the hydraulic pressure in the pressure chamber detected by the hydraulic pressure detector reaches a predetermined threshold value. The second control position is set from a position of the piston where the piston is moved back from the reference position in a hydraulic pressure release direction by a predetermined amount to establish the communication between the pressure chamber and the reservoir. The first control position is set from a position of the piston where the piston is moved forward from the second control position in the hydraulic pressure generation direction by a predetermined amount.

BRIEF DESCRIPTION OF THE DRAWINGS

FIG. 9 is a flowchart illustrating control of a controller of a brake apparatus according to a fourth embodiment; and FIG. 10 is a time chart illustrating an example of an operation of the brake apparatus according to the fourth embodiment;

DETAILED DESCRIPTION OF THE PREFERRED EMBODIMENTS

Figure 1:
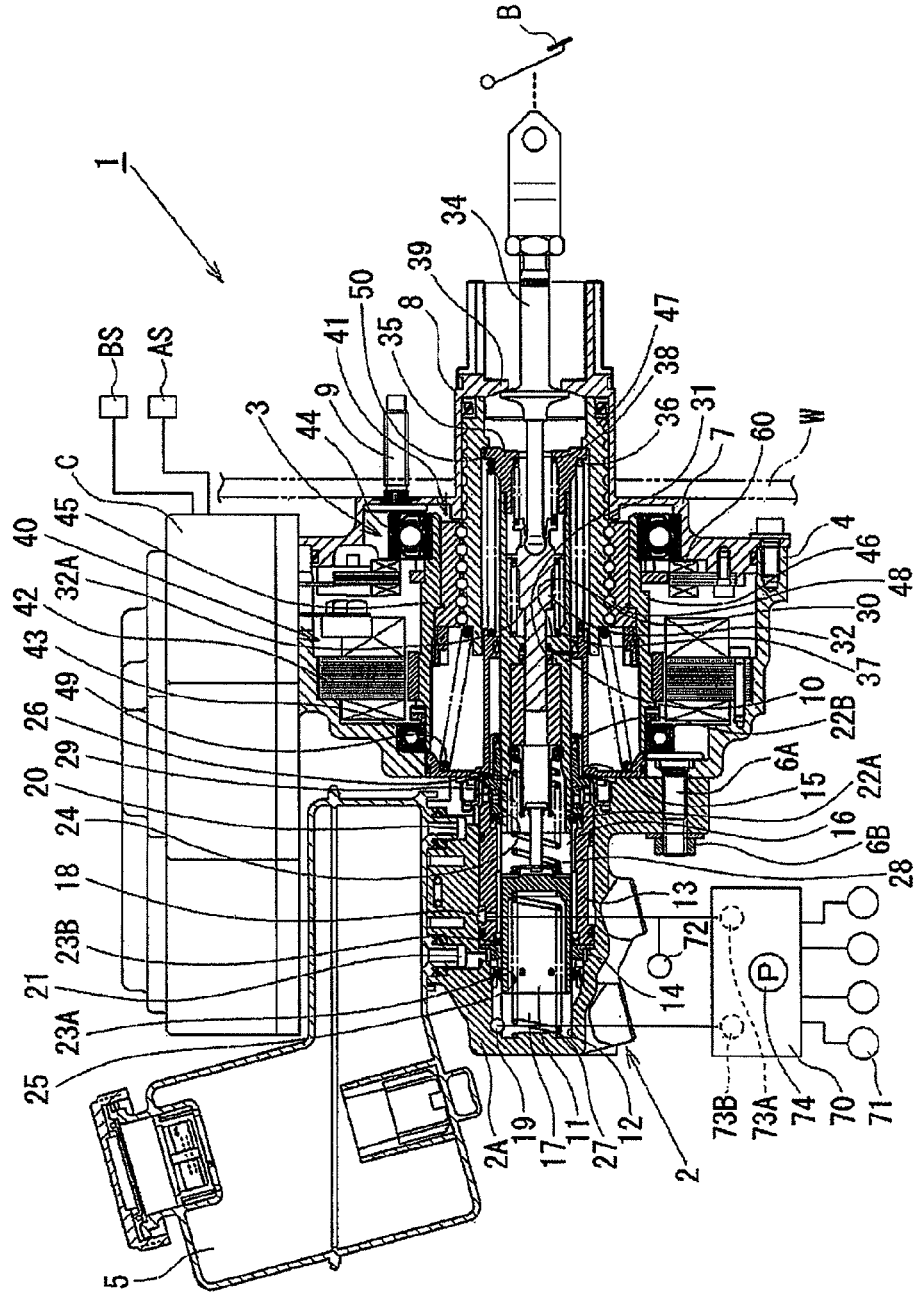
FIG. 1 is a vertical cross-sectional view illustrating an overall structure of a brake apparatus according to a first embodiment, and a master cylinder and an electric booster of the brake apparatus.

Hereinafter, embodiment of the present invention will be described in detail with reference to the accompanying drawings. A first embodiment will be described with reference to FIGS. 1 to 3 and 7. As shown in FIG. 1, a brake apparatus 1 according to the present embodiment includes a tandem-type master cylinder 2, and a case 4 with an electric booster (booster) installed therein. A reservoir 5 is connected to the master cylinder 2. The master cylinder 2 includes a substantially bottomed cylindrical cylinder main body 2A. The opening side of the cylinder main body 2A is coupled to the front portion of the case 4 by a stud bolt 6A and a nut 6B. A controller C as a control means is attached to the top of the case 4. A flat attachment seat surface 7 is formed at the rear portion of the case 4. A cylindrical guide portion 8, which is disposed coaxially with the master cylinder 2, protrudes from the attachment seat surface 7. The brake apparatus 1 is disposed in an engine room of a vehicle. The guide portion 8 extends into a vehicle compartment through a portioning wall W separating the engine room and the vehicle compartment. The brake apparatus 1 is fixed with use of a stub bolt 9 disposed on the attachment seat surface 7 with the attachment seat surface 7 in abutment against the partitioning wall W.

A cylindrical primary piston 10, which is constituted by a piston having a cup-shaped tip, is fittedly disposed at the opening side of the cylinder main body 2A, and a cup-shaped secondary piston 11 is fittedly disposed at the bottom side of the cylinder main body 2A in the cylinder main body 2A of the master cylinder 2. The rear end of the primary piston 10 protrudes from the opening of the master cylinder 2 into the case 4 to reach the vicinity of the guide portion 8. The primary piston 10 and the secondary piston 11 are slidably guided by annular guide members 14 and 15 disposed at the opposing ends of a sleeve 13 fitted in a cylinder bore 12 of the cylinder main body 2A. Two pressure chambers, a primary chamber 16 and a secondary chamber 17 are defined in the cylinder main body 2A by the primary piston 10 and the secondary piston 11. Hydraulic pressure ports 18 and 19 are formed at the primary chamber 16 and the secondary chamber 17, respectively. The hydraulic ports 18 and 19 are connected to a brake caliper 71 of each wheel through a hydraulic controller (hydraulic pressure supply apparatus) 70 including two hydraulic pressure circuit systems. The brake caliper 71 is a brake mechanism for braking a wheel by generating a brake force in response to a supply of brake fluid. Alternatively, the brake caliper 71 may be replaced with another wheel cylinder such as a drum brake.

Reservoir ports 20 and 21 are formed at the upper side of the side wall of the cylinder main body 2A for establishing communication between the primary and secondary chambers 16 and 17 and the reservoir 5. Two seal members 22A and 22B provide a seal between the cylinder bore 12 of the cylinder main body 2A and the primary piston 10. Similarly, two seal members 23A and 23B provide a seal between the cylinder bore 12 of the cylinder main body 2A and the secondary piston 11. The seal members 22A and 22B are disposed so as to be located opposite of the reservoir port 20 from each other along the axial direction. The seal member 22A of these seal members is arranged so that the primary chamber 16 is in communication with the reservoir port 20 via a port 24 formed through the side wall of the primary piston 10 when the primary piston 10 is located at a brake release position shown in FIG. 1, while the primary chamber 16 is out of communication with the reservoir port 20 when the primary piston 10 is moved forward from the brake release position. Similarly, the seal members 23A and 23B are disposed so as to be located opposite of the reservoir port 21 from each other along the axial direction. The seal member 23A of these seal members is arranged so that the secondary chamber 17 is in communication with the reservoir port 21 via a port 25 formed through the side wall of the secondary piston 11 when the secondary piston 11 is located at a brake release position shown in FIG. 1, while the secondary chamber 17 is out of communication with the reservoir port 21 when the secondary piston 11 is moved forward from the brake release position.

A spring assembly 26 is disposed between the primary piston 10 and the secondary piston 11 in the primary chamber 16. Further, a return spring 27, which is a compression coil spring, is disposed between the bottom of the master cylinder 2 and the secondary piston 11 in the secondary chamber 17. The spring assembly 26 maintains a compression coil spring in a predetermined compressed state with the aid of a cylindrical retainer 29 capable for extending and contracting the coil, and allows the spring to be compressed against the spring force thereof.

The primary piston 10 includes the cup-shaped tip, a cylindrical rear portion, and a middle wall 30 partitioning the interior of the primary piston 10 in the axial direction. The middle wall 30 includes a guide bore 31 axially penetrating the middle wall 30. An input piston 32 as input member, which has a stepped shape with a stepped portion 32A formed thereat, is disposed in such a manner that its tip having a small diameter is slidably and liquid-tightly inserted through the guide bore 31. The tip of the input piston 32 is inserted in the cylindrical retainer 29 of the spring assembly 26 in the primary chamber 16.

The rear end of the input piston 32 is coupled to the tip of an input rod 34 inserted through the guide portion 8 of the case 4 and the rear portion of the primary piston 10. The rear end side of the input rod 34 extends from the guide portion 8 outwardly, and is coupled to a brake pedal B that a driver operates to issue a brake instruction. A flange-like spring retainer 35 is attached to the rear end of the primary piston 10. The primary piston 10 is biased backward by a return spring 36 which is a compression coil spring disposed between the front wall side of the case 4 and the spring retainer 35. The input piston 32 is elastically held at a neutral position shown in FIG. 1, by springs 37 and 38 which are spring members disposed between the input piston 32 and the middle wall 30 of the primary piston 10, and the input piston 32 and the spring retainer 35, respectively. The retracted position of the input rod 34 is determined by a stopper 39 provided at the rear end of the guide portion 8 of the case 4.

The case 4 contains an actuator 3 which includes an electric motor 40 as an electric actuator, and a ball and screw mechanism 41 configured to convert a rotation of the electric motor 40 into a linear motion to provide a thrust force to the primary piston 10. The electric motor 40 includes a stator 42 fixed to the case 4, and a hollow rotor 45 disposed so as to face the stator 42 and rotatably supported to the case 4 through bearings 43 and 44. The ball and screw mechanism 41 includes a nut member 46 which is a rotational member fixed to the inner circumference of the rotor 45, a hollow screw shaft 47 which is a linear motion member inserted through the nut member 46 and the guide portion 8 of the case 4 and supported so as to be movable along the axial direction but non-rotatable around the axis, and a plurality of balls 48 disposed between screw grooves formed on the opposing surfaces of the nut member 46 and the screw shaft 47. The ball and screw mechanism 41 is configured such that the screw shaft 47 is axially moved due to rolling motions of the balls along the screw grooves according to a rotation of the nut member 46. The ball and screw mechanism 41 can convert a rotation to a linear motion and also convert a linear motion to a rotation between the nut member 46 and the screw shaft 47.

A known speed reduction mechanism such as a planetary gear mechanism or a differential gear speed reduction mechanism may be disposed between the electric motor 40 and the ball and screw mechanism 41 to slow down a rotation of the electric motor 40 and transmit the slowed down rotation to the ball and screw mechanism 41.

The screw shaft 47 of the ball and screw mechanism 41 is biased backward by a return spring 49, which is a compression tapered coil spring disposed between the screw shaft 47 and the front wall side of the case 4, and the retracted position of the screw shaft 47 is determined by the stopper 39 provided at the guide portion 8 of the case 4. The rear end of the primary piston 10 is inserted in the screw shaft 47, and the retracted position of the primary piston 10 is determined by the abutment of the spring retainer 35 against a stepped portion 50 formed on the inner circumference of the screw shaft 47. As a result, the primary piston 10 can be moved forward together with the screw shaft 47, and can also be moved forward alone by being separated from the stepped portion 50. As shown in FIG. 1, the retracted position of the primary piston 10 is determined by the stepped portion 50 of the screw shaft 47 in abutment against the stopper 39, and the retracted position of the secondary piston 11 is determined by the primary piston 10 located at its retracted position and the maximum length of the spring assembly 26. The stepped portion 50 of the screw shaft 47 is positioned within the range of the axial length of the nut member 46.

The brake apparatus 1 has various kinds of sensors including a stroke sensor (not shown) for detecting displacements of the brake pedal B, the input piston 32, and the input rod 34, a rotational position sensor 60 for detecting the rotational position of the rotor 45 of the electric motor 40 (i.e., a detector for detecting the position of the primary piston 10 coupled to the rotor 45), a hydraulic pressure sensor 72 which is a hydraulic pressure detector for detecting the hydraulic pressures in the primary and secondary chambers 16 and 17, and an electric current sensor for detecting electric current applied to the electric motor 40. The controller C is an electronic controller based on a microprocessor including, for example, a CPU and a RAM, and controls a rotation of the electric motor 40 based on detection signals of these various sensors.

Further, the hydraulic controller 70 includes cutoff valves 73A and 73B for disconnecting the hydraulic controller 70 from the primary chamber 16 and the secondary chamber 17 of the master cylinder 2, a hydraulic pump 74, an accumulator, a switching vale, and the like. The hydraulic controller 70 can carry out various kinds of control modes such as a normal control mode for supplying a hydraulic pressure from the master cylinder 2 to the brake caliper 71 of each wheel, a pressure reduction mode for reducing the hydraulic pressure in the brake caliper 71 of each wheel, a maintenance mode for maintaining the hydraulic pressure in the brake caliper 71 of each wheel, a pressure increase mode for recovering the reduced hydraulic pressure in the brake caliper 71, and a pressurization mode for supplying a hydraulic pressure to the brake caliper 71 of each wheel by driving the hydraulic pump 74 regardless of the hydraulic pressure in the master cylinder 2.

The hydraulic controller 70 can realize various kinds of brake control by performing control of these operation modes by appropriately carrying out a brake instruction according to the vehicle condition. Examples of possible brake control include a brake force distribution control of appropriately distributing a brake force to the respective wheels according to, for example, a vertical load during a brake operation, anti-lock brake control of preventing a wheel from being locked by automatically adjusting a brake force applied to each wheel during a brake operation, vehicle stability control of stabilizing the behavior of a vehicle by detecting a skid of a wheel while the vehicle is running to appropriately automatically provide a brake force to each wheel regardless of an operation amount of the brake pedal to prevent an understeer state and an oversteer state, hill start aid control of helping a start by maintaining a braked state on a sloping road (especially upwardly sloping road), traction control of preventing an idle rotation of a wheel when the vehicle is starting, vehicle follower control of maintaining a predetermined distance to a preceding vehicle, lane departure prevention control of maintaining a vehicle within a driving lane, and obstacle avoidance control of preventing a vehicle from colliding with an obstacle.

Next, an operation of the brake apparatus 1 will be described. When the brake pedal B is operated and the input piston 32 is moved forward through the input rod 34, the stroke sensor detects the displacement of the input piston 32, and the controller C controls the operation of the electric motor 40 based on the displacement of the input piston 32. Then, the primary piston 10 is moved forward through the ball and screw mechanism 41 to follow the displacement of the input piston 32. As a result, a hydraulic pressure is generated in the primary chamber 16, and the generated hydraulic pressure is transmitted to the secondary chamber 17 through the secondary piston 11. In this way, the brake hydraulic pressure generated in the master cylinder 2 is supplied from the hydraulic pressure ports 18 and 19 to the brake caliper 71 of each wheel through the hydraulic controller 70, thereby generating a brake force.

On the other hand, when the operation of the brake pedal B is released, the input piston 32, the primary piston 10, and the secondary piston 11 are moved backward, which causes the pressures in the primary and secondary chambers 16 and 17 to be reduced, thereby releasing a brake operation. In the following, only the primary piston 10 will be described, since the primary piston 10 and the secondary piston 11 operate in a substantially same manner.

When the brake is applied, a part of the hydraulic pressure in the primary chamber 16 is received by the input piston 32 (having a smaller pressure-receiving area than that of the primary piston 10), and the reaction force thereof is fed back to the brake pedal B through the input rod 34. As a result, a desired brake force can be generated at a predetermined boosting ratio according to the ratio of the pressure-receiving areas of the primary piston 10 and the input piston 32. Further, an appropriate reaction force can be applied to the brake pedal B during brake control such as boosting control, brake assist control, regenerative cooperative control by appropriately adjusting the position of the primary piston 10 as a follower relative to the input piston 32 to cause the spring forces of the springs 37 and 38 to act on the input piston 32 to adjust the reaction force applied to the input rod 34.

Figure 2A:
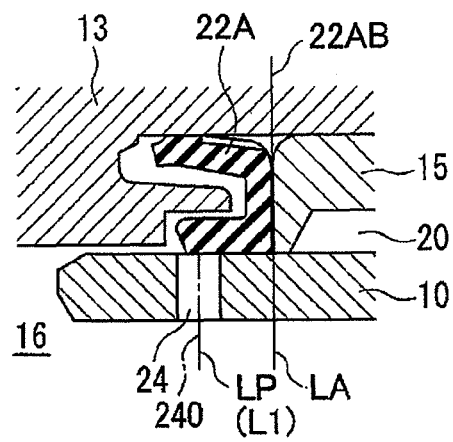
FIG. 2A is an enlarged view illustrating a position of a primary piston of the master cylinder shown in FIG. 1 when the brake is released, illustrating the primary piston 10 located at a hydraulic pressure generation position LP.
Figure 2B:
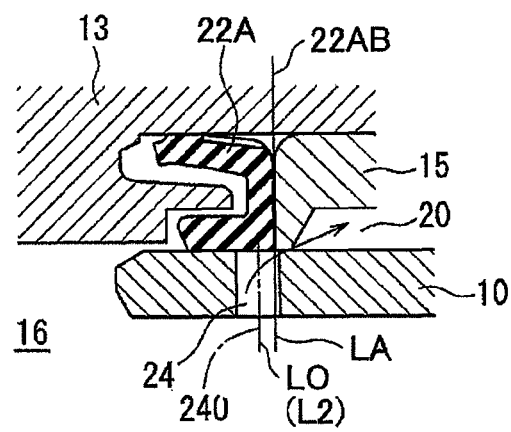
FIG. 2B is an enlarged view illustrating a position of the primary piston of the master cylinder shown in FIG. 1 when the brake is released, illustrating the primary piston 10 located at a hydraulic pressure release position LO.
Figure 2C:
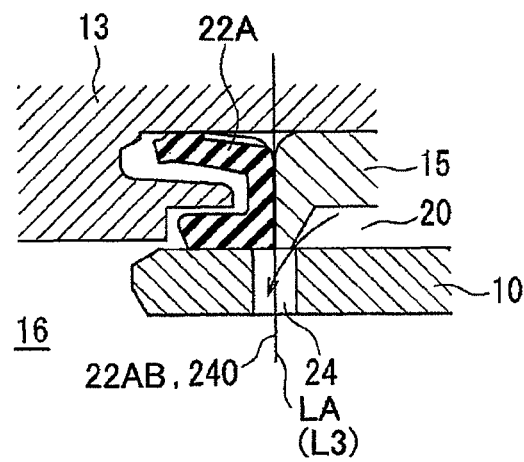
FIG. 2C is an enlarged view illustrating a position of the primary piston of the master cylinder shown in FIG. 1 when the brake is released, illustrating the primary piston 10 located at a position LA.

Next, the setting of a control position, which is a position at which the primary piston 10 is held when the brake is released, will be described with reference to FIGS. 2(A) to (C). In FIGS. 2(A) to 2(C), the position of the primary piston 10 is indicated by a stroke position from a position LA (refer to FIG. 2(C)) where a central position 240 of the port 24 and a rear end position 22AB of the seal member 22A are aligned.

As shown in FIG. 2(A), when brake application is started, the primary piston 10 is moved forward to a hydraulic pressure generation position LP where the communication is broken between the port 24 formed through the sidewall of the primary piston 10 and the reservoir port 20 by the seal member 22A, whereby the primary chamber 16 is out of communication with the reservoir 5 to cause a pressure increase to immediately start in the primary chamber 16.

On the other hand, as shown in FIG. 2(B), when the brake is released, the primary piston 10 is moved backward to a hydraulic pressure release position LO (LO<LP) where the communication is established between the port 24 formed through the sidewall of the primary piston 10 and the reservoir port 20, whereby the primary chamber 16 is in communication with the reservoir 5 to cause the hydraulic pressure in the primary chamber 16 to be released. As a result, it is possible to prevent occurrence of a brake drag by releasing the hydraulic pressure in the primary chamber 16, and to allow the brake fluid to be supplied and received between the primary chamber 16 and the reservoir 5, thereby enabling compensation for wear of the brake pad and compensation of the volume of the brake fluid.

Some of conventional techniques control the position of the primary piston 10 by mechanically setting the maximally retracted position of the primary piston 10 based on the hydraulic pressure release position LO in consideration of a variation in the dimensional accuracy of the respective parts, and setting that position as the position of the primary piston 10 when the brake is released (control position). However, this setting leads to an increase in the stroke (invalid stroke) that the primary piston 10 has until the primary piston 10 reaches the hydraulic pressure generation position LP to cause a rise of the hydraulic pressure in the primary chamber 16 when brake application is started, thereby causing a driver to have an uncomfortable feeling to the brake operation. Especially, as the distance between the hydraulic pressure release position LO and the maximally retracted position of the primary piston 10 is increased due to a variation in the dimensional accuracy of the respective parts, the invalid stroke is increased accordingly, thereby raising a problem in terms of a driver's brake operation feeling.

Therefore, the present embodiment sets two points, a first control position L1 corresponding to the hydraulic pressure generation position LP, and a second control position L2 corresponding to the hydraulic pressure release position LO, as the position of the primary piston 10 when the brake is released (control position). When the primary piston 10 is located at the first control position L1 corresponding to the hydraulic pressure generation position LP, the flow passage between the primary chamber 16 and the reservoir 5 may be completely blocked, or may be narrowed enough to generate a hydraulic pressure in the primary chamber 16 according to a forward movement of the primary piston 10. On the other hand, when the primary piston 10 is located at the second control position L2, the flow passage between the primary chamber 16 and the reservoir 5 should be opened at least enough to release the hydraulic pressure in the primary chamber 16 to the reservoir 5.

According to this setting, when the brake is released, the primary piston 10 can be held at the first control position L1 corresponding to the hydraulic pressure generation position LP, whereby the invalid stroke can be reduced, and a quick rise of the hydraulic pressure in the primary chamber 16 can be ensured in response to a forward movement of the primary piston 10, as a result of which it is possible to improve the responsiveness of vehicle braking in response to a brake pedal operation. Further, the present embodiment is configured so that the tip of the input piston 32 faces the interior of the primary chamber 16, thereby can be expected to improve a driver's brake operation feeling. Further, when the primary piston 10 is held at the second control position L2 corresponding to the hydraulic pressure release position LO, it can be ensured that the hydraulic pressure in the primary chamber 16 is released to the reservoir 5, and therefore it is possible to prevent occurrence of a brake drag. Further, it is possible to smoothly compensate for wear of the brake pad and maintain the volume of the brake fluid. The present embodiment controls the position of the primary piston 10 by switching the control position between the first and second control positions L1 and L2 at appropriate timing according to the vehicle condition.

The controller C sets the first and second control positions L1 and L2 of the primary piston 10 in the following manner. This setting is performed during system-up of the brake apparatus 1, for example, when the ignition of the vehicle is set from OFF to ON, when the parking brake is in operation while the brake pedal B is not operated, and when the transmission is set in the P range.

The controller C causes the electric motor 40 to operate the primary piston 10 to be moved forward at a predetermined speed, and monitors the hydraulic pressure in the primary chamber 16 based on an output from the hydraulic sensor 72. When the primary piston 10 is moved forward so that the hydraulic pressure in the primary chamber 16 reaches a predetermined threshold value (for example, approximately 0.01 to 0.05 MPa), the controller C sets the position (hydraulic pressure generation detected position) of the primary piston 10 at that time as a reference position LB. At this time, it is preferable to sealingly close the primary chamber 16 by closing the hydraulic pressure ports 18 and 19 by the cutoff valves 73A and 73B of the hydraulic controller 70. This can increase the hydraulic rigidity of the primary chamber 16, and therefore it becomes possible to improve the sensitivity of hydraulic pressure detection of the hydraulic sensor 72, and reduce the time required to detect the hydraulic pressure. Then, the controller C subtracts a predetermined distance α from the reference position LB and sets the calculated position as the first control position L1, and further, subtracts a predetermined distance β larger than the distance α from the reference position LB and sets the calculated position as the second control position L2.

first control position $L1$=reference position $LB-\alpha$ second control position $L2$=reference position $LB-\beta$ $\beta>\alpha$ At this time, the distance α, which determines the first control position L1, is determined in consideration of the dimensions and dimensional tolerances of the port 24, the seal member 22A, and the seal groove receiving the seal member 22A in such a manner that the communication can be unfailingly broken between the port 24 of the sidewall of the primary piston 10 and the reservoir port 20 by the seal member 22A or is narrowed enough to generate a hydraulic pressure in the primary chamber 16 as mentioned above when the primary piston is located at the first control position L1. Further, the distance β, which determines the second control position L2, is determined in consideration of the dimensions and dimensional tolerances of the port 24, the seal member 22A, and the seal groove receiving the seal member 22A in such a manner that the primary chamber 16 is opened to the reservoir 5 with an appropriate flow passage area ensured through the port 24 of the sidewall of the primary piston 10 when the primary piston 10 is located at the second control position L2. The distance α may be a negative value so that the first control position L1 is located ahead of the reference position LB. In this case, it is possible to further reduce the invalid stroke, thereby improving the responsiveness of vehicle braking in response to a brake pedal operation.

In this way, the second control position L2 can be set as a position where the primary chamber 16 and the reservoir 5 are in communication with each other with the primary piston 10 moved back by the predetermined amount β from the reference position LB, and the first control position L1 can be set as a position where the primary piston 10 reaches by being moved forward by a predetermined amount (i.e., β−α) from the second control position L2.

The controller C controls the position of the primary piston 10 with use of the thus-set first and second control positions L1 and L2 in the following manner. When a driver does not operate the brake pedal and the brake is not applied, the controller C holds the primary piston 10 at the first control position L1 for a predetermined time, and then moves back the primary piston 10 to the second control position L2 to hold it there for a predetermined time. After that, the controller C alternately holds the primary piston 10 at the first and second control positions L1 and L2 at a predetermined time interval. As a result, it becomes possible to reduce the invalid stroke to improve the responsiveness when brake application is started, while releasing the hydraulic pressure in the primary chamber 16 to the reservoir 5 to prevent occurrence of a brake drag when the brake is released.

Figure 3:
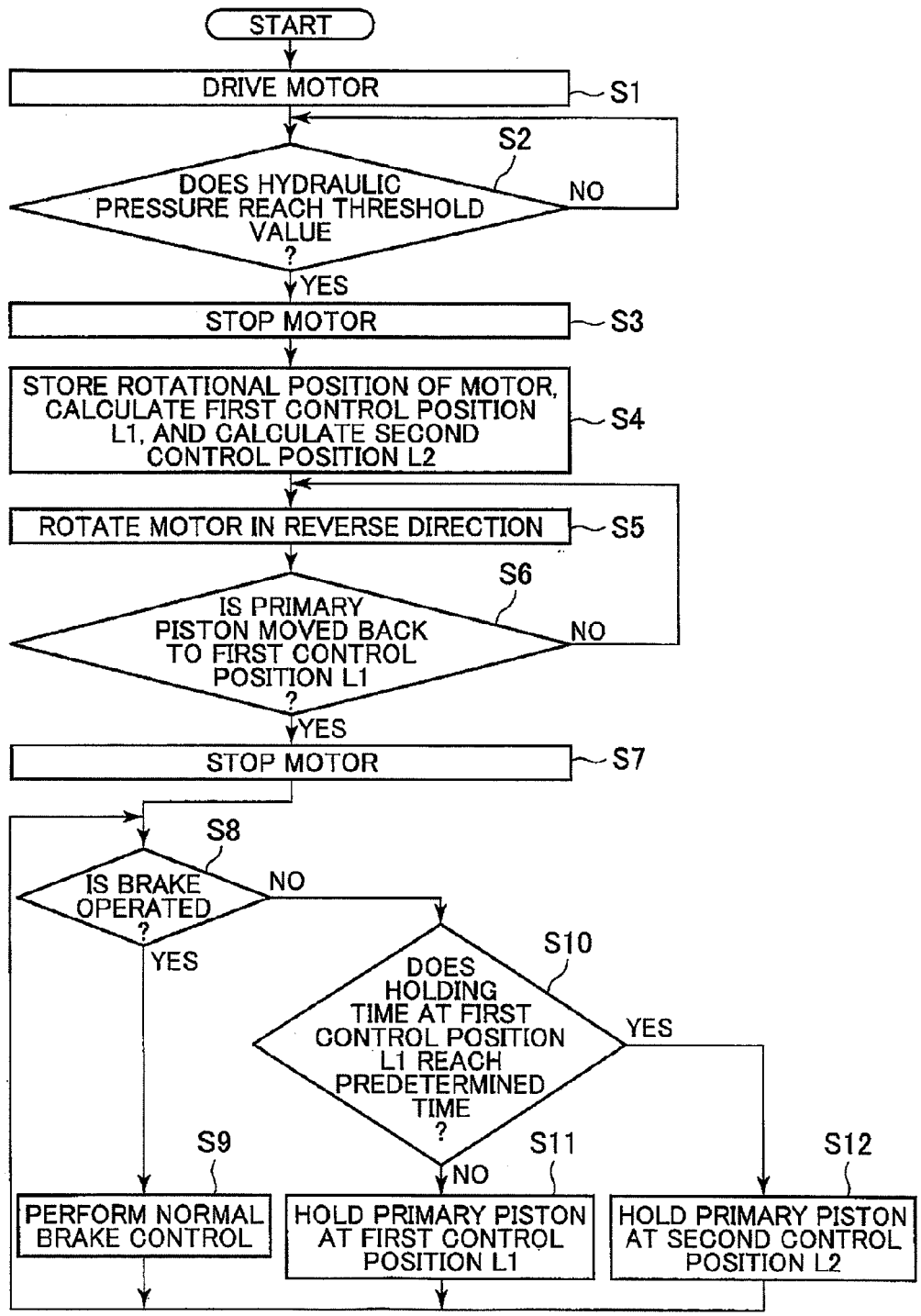
FIG. 3 is a flowchart illustrating control of a controller of the brake apparatus shown in FIG. 1.
Figure 4:
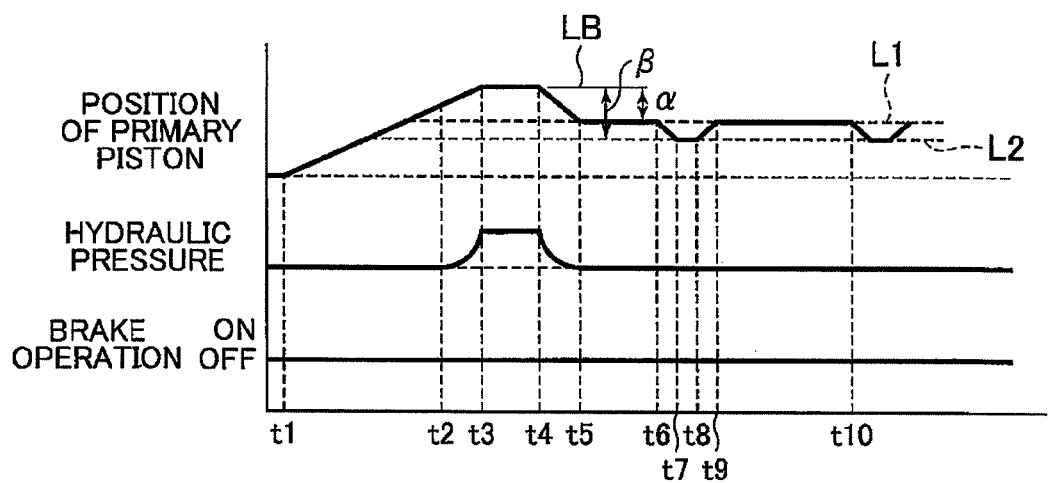
FIG. 4 is a time chart illustrating an example of an operation of the brake apparatus shown in FIG. 1.

The control flow of the controller C will be described with reference to the flowchart of FIG. 3 and the time chart of FIG. 4. In step S1, the controller C drives the electric motor 40 to move the primary piston 10 forward (time t1), so that the hydraulic pressure in the primary chamber 16 is increased (time t2). In step S2, the controller C monitors the hydraulic pressure in the primary chamber 16 based on the output of the hydraulic sensor 72 and determines whether the hydraulic pressure reaches a predetermined threshold value to determine whether a hydraulic pressure is generated. When the hydraulic pressure in the primary chamber 16 reaches the predetermined threshold value (time t3), the processing proceeds to step S3, in which the controller C stops the electric motor 40 (time t3). Then, the processing proceeds to step S4.

In step S4, the controller C detects the rotational position of the electric motor 60 based on the output of the rotational position sensor 60, and stores the rotational position of the electric motor 40 when the hydraulic pressure in the primary chamber 16 reaches the predetermined threshold value as the reference position (i.e., the reference position LB of the primary piston 10). Then, the controller C calculates the first and second control positions L1 and L2 (L1=LB−α, and L2=LB−β) based on the reference position LB of the primary piston 10 as mentioned above, and stores them. Then, the processing proceeds to step S5.

In step S5, the controller C causes a reverse rotation of the electric motor 40 to move the primary piston 10 backward (time t4). In step S6, the controller C detects the rotational position of the electric motor 40 (i.e., the position of the primary piston 10) based on the output of the rotational position sensor 60 to determine whether the primary piston 10 reaches the first control position L1. After the primary piston 10 reaches the first control position L1, the processing proceeds to step S7. In step S7, the controller C stops the electric motor 40 (time t5), and then the processing proceeds to step S8.

In step S8, the controller C determines whether the brake is operated based on, for example, a brake switch BS configured to detect an operation of the brake pedal B. If the brake is operated, the processing proceeds to step S9, in which the controller C performs the above-described normal brake control to generate a hydraulic pressure in the master cylinder 2 according to the operation amount of the brake pedal B to supply the hydraulic pressure to the brake caliper 71 of each wheel, thereby generating a brake force. On the other hand, in step S8, if the controller C determines that the brake is not operated, the processing proceeds to step S10.

In step S10, the controller C causes a timer to start counting a holding time for which the primary piston 10 is held at the first control position L1, and determines whether the holding time, for which the primary piston 10 is held at the first control position L1, reaches a predetermined time. If the holding time does not reach the predetermined time, the processing proceeds to step S11. In step S11, the controller C continues to hold the primary piston 10 at the first control position L1, and then the processing returns to step S8. On the other hand, if the controller C determines in step S10 that the holding time, for which the primary piston 10 is held at the first control position L1, reaches the predetermined time (time 6), then the processing proceeds to step S12.

In step S12, the controller C moves the primary piston 10 backward to the second control position L2 (time t7), causes the timer to start counting this duration time, thereby performing the processing for holding the primary piston 10 at the second control position L2. Then, the processing returns to step S8. The controller C repeats this processing. If the controller C determines in step S12 that a holding time, for which the primary piston 10 is held at the second control position L2, reaches a predetermined time (time t8), the controller C performs the processing for starting to hold the primary piston 10 at the first control position L1. After that, the processing proceeds to step S8. More specifically, the controller C carries out the processing of steps S214 to S216 shown in the flowchart of FIG. 7. According to this processing, the controller C alternately holds the primary piston 10 at the first and second control positions L1 and L2 at the predetermined time interval (repeats the processing from time t6 to time t10 as one cycle). In this way, the controller C switches the position of the primary piston 10 between the first and second control positions L1 and L2.

Figure 5:
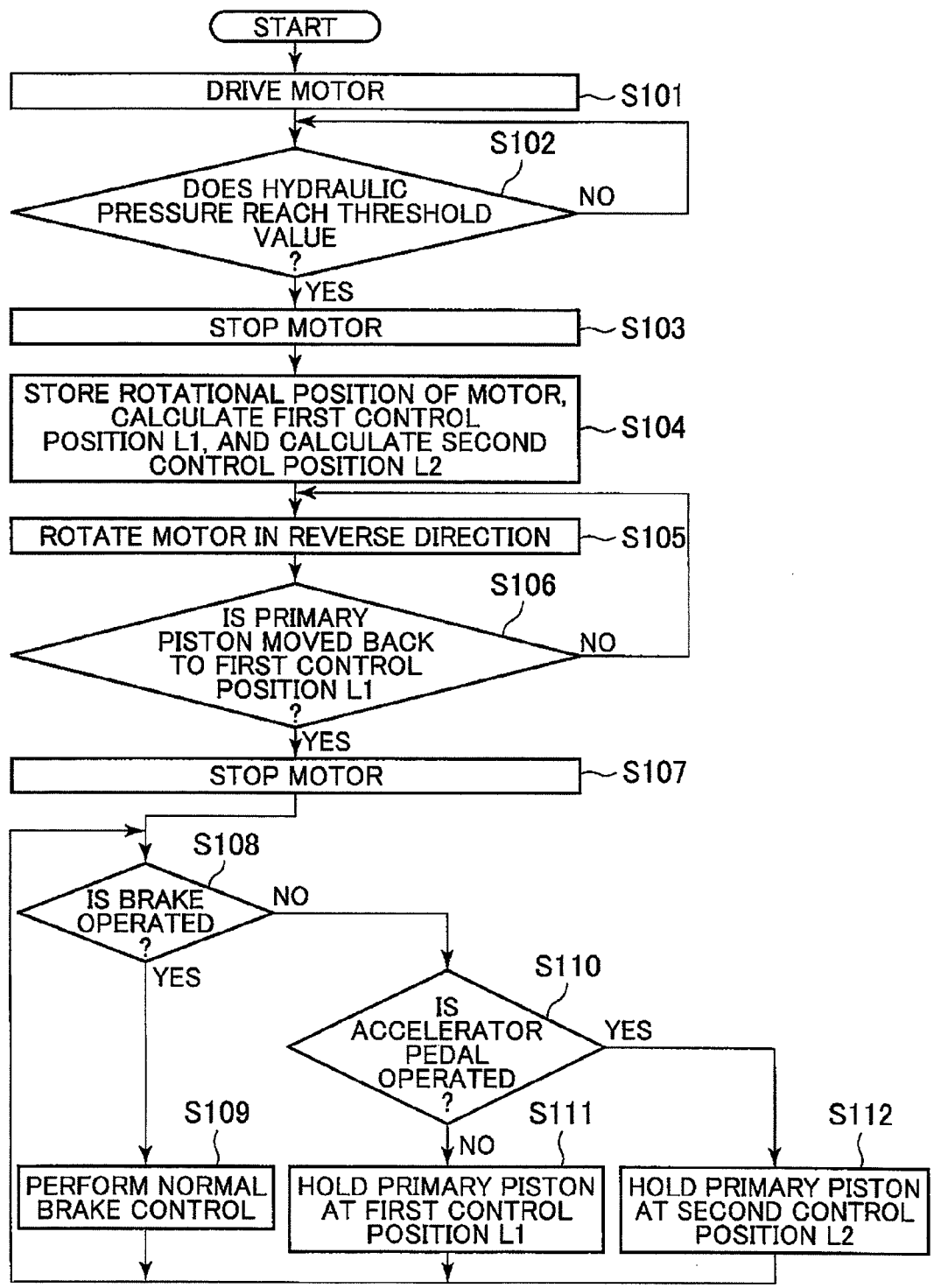
FIG. 5 is a flowchart illustrating control of a controller of a brake apparatus according to a second embodiment.
Figure 6:
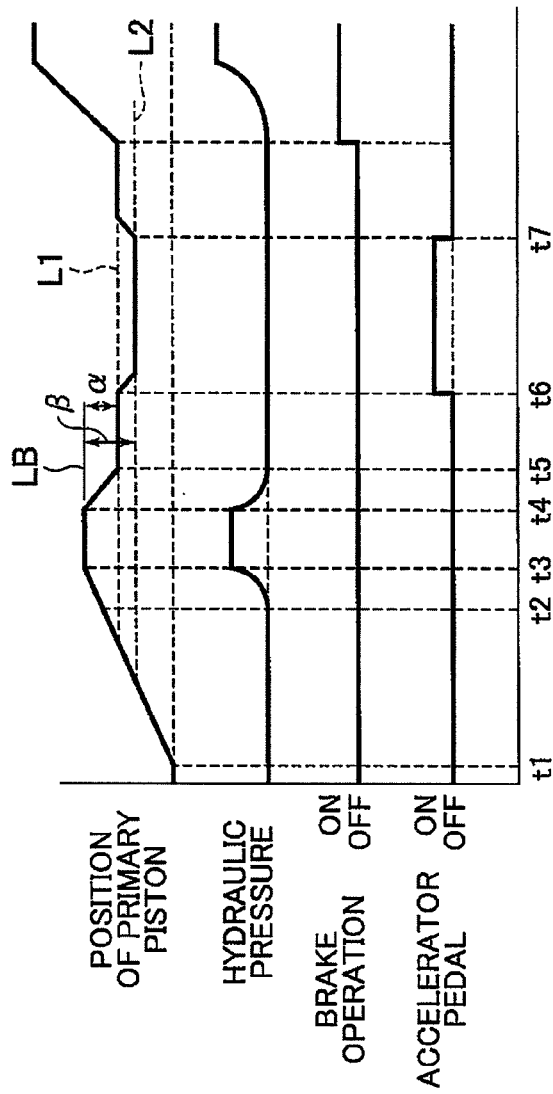
FIG. 6 is a time chart illustrating an example of an operation of the brake apparatus according to the second embodiment.

Next, a second embodiment of the present invention will be described with reference to, mainly, FIGS. 5 and 6. In the following description, like portions will be denoted by like reference numerals as those in the first embodiment, and only different portions will be described in detail. In the present embodiment, the controller C monitors an operation of an acceleration pedal of the vehicle with use of, for example, an accelerator pedal sensor AS. In a brake release state in which the brake is not operated, if the acceleration pedal is not pressed, the controller C holds the primary piston 10 at the first control position L1 corresponding to the hydraulic pressure generation position LP. If the accelerator pedal is pressed, the controller C holds the primary piston 10 at the second control position L2 corresponding to the hydraulic pressure release position LO.

When the accelerator pedal is not pressed in a brake release state, normally, it is estimated that the driver is slowing down the vehicle, and almost starts to operate the brake. At this time, since the primary piston 10 is held at the first control position L1, it is possible to generate a brake force by immediately increasing the hydraulic pressure in the primary chamber 16 in response to an operation of the brake pedal B, thereby improving the responsiveness of vehicle braking in response to the brake operation. On the other hand, when the accelerator pedal is pressed, normally, it is estimated that the driver is speeding up the vehicle or is driving the vehicle in a normal manner, and is unlikely to operate the brake at this moment. In this case, since the primary piston 10 is held at the second control position L2, it is possible to unfailingly release the hydraulic pressure in the primary chamber 16 to the reservoir 5, thereby preventing occurrence of a brake drag to contribute to low-fuel consumption of the vehicle, while enabling the compensation for wear of the brake pad and the compensation of the volume of the brake fluid.

The control flow of the controller C will be described with reference to the flowchart of FIG. 5 and the time chart of FIG. 6.

The processing from step S101 to step S109 (time t1 to time t5) is the same as the processing from step S1 to step S9 in the above-described first embodiment, and therefore will not be described repeatedly.

In step S110, the controller C determines whether the accelerator pedal is pressed based on the output of the accelerator pedal sensor AS. If the accelerator pedal is not pressed (time t7), the processing proceeds to step S111, in which the controller C holds the primary piston 10 at the first control position L1, and then the processing returns to step S108. On the other hand, if the accelerator pedal is pressed (time t6), the processing proceeds to step S112, in which the controller C holds the primary piston 10 at the second control position L2, and the processing returns to step S108. In this way, the controller C switches the position of the primary piston 10 between the first and second control positions L1 and L2.

Figure 7:
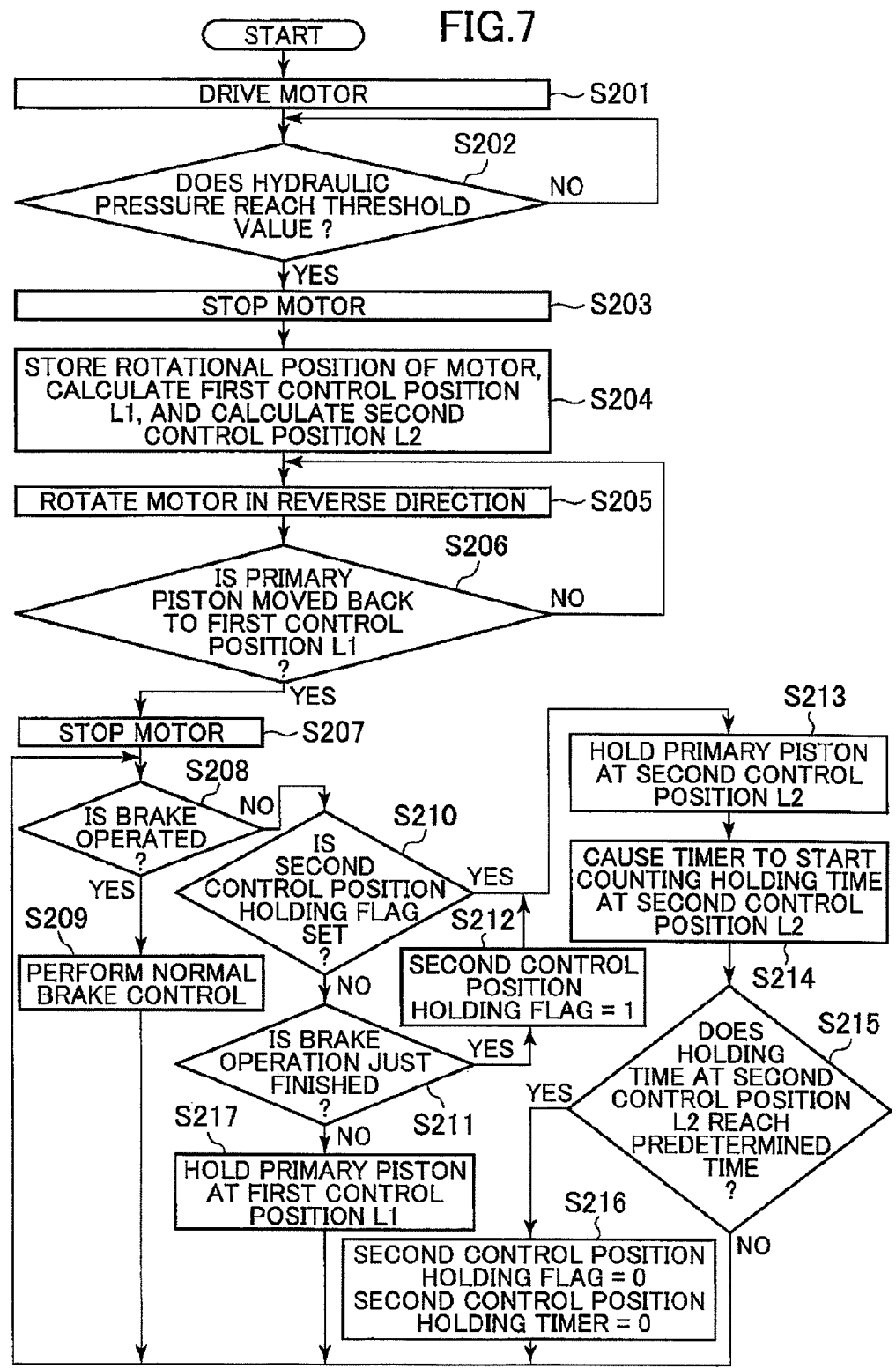
FIG. 7 is a flowchart illustrating control of a controller of a brake apparatus according to a third embodiment.
Figure 8:
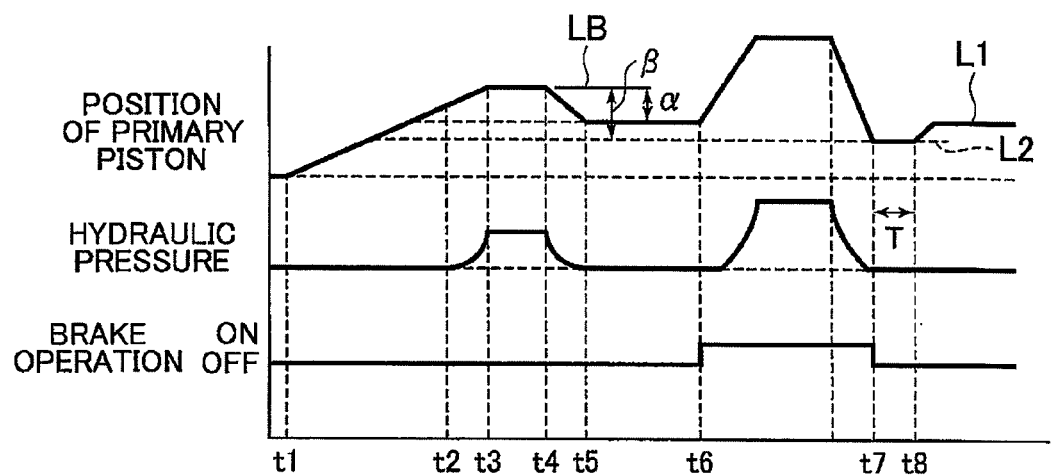
FIG. 8 is a time chart illustrating an example of an operation of the brake apparatus according to the third embodiment.

Next, a third embodiment of the present invention will be described with reference to, mainly, FIGS. 7 and 8. In the following description, like portions will be denoted by like reference numerals as those in the first embodiment, and only different portions will be described in detail. In the present embodiment, in a brake release state in which the brake pedal B is not operated, immediately after a brake operation is finished, the controller C holds the primary piston 10 at the second control position L2 corresponding to the hydraulic pressure release position L0 for a predetermined time. Except for that, the controller C holds the primary piston 10 at the first control position L1 corresponding to the hydraulic pressure generation position LP. As a result, the following effect can be expected. Immediately after a brake operation, the vehicle is easily affected by frictional heat generated during the brake operation, but releasing the hydraulic pressure in the primary chamber 16 to the reservoir 5 ensures the compensation of the volume of the brake fluid against the frictional heat, thereby preventing occurrence of a brake drag. Further, in a normal state in which the hydraulic circuit is relatively stabilized, the primary piston 10 is held at the first control position L1, whereby it is possible to quickly increase the hydraulic pressure in the primary chamber 16 in response to an operation of the brake pedal B, thereby improving a driver's feeling to a brake operation.

The control flow of the controller C will be described with reference to flowchart of FIG. 7 and the time chart of FIG. 8. The processing from step S201 to step S209 (time t1 to time t5) is the same as the processing from step S1 to step S9 in the above-described first embodiment, and therefore will not be described repeatedly. In step S210, the controller C determines whether a second control position holding flag is set. If the second control position holding flag is not set, the processing proceeds to step S211. If the second control position holding flag is set, the processing proceeds to step S213. In step S211, the controller C determines whether the vehicle is in such a state that the brake operation is just finished based on, for example, whether the brake switch BS is turned on or off. If the vehicle is in such a state that the brake operation is just finished (the brake pedal B is pressed at time t6, and then is released at time t7), the processing proceeds to step S212. If the vehicle is not in such a state that the brake operation is just finished, the processing proceeds to step S217. In step S212, the controller C sets the second control position holding flag, and then the processing proceeds to step S213.

In step S213, the controller C holds the primary piston 10 at the second control position L2 (time t7), and then the processing proceeds to step S214. In step S214, the controller C causes the timer to start counting the holding time, for which the primary piston 10 is held at the second control position L2, and then the processing proceeds to step S215. In step S215, the controller C determines based on the count value of the timer whether the holding time, for which the primary piston 10 is held at the second control position L2, reaches a predetermined time T. If the holding time reaches the predetermined time T, the processing proceeds to step S126 in which the controller C resets the second control position flag, and resets the count value of the timer that counts the holding time at the second control position L2. Then, the processing returns to step S208. If the holding time does not reach the predetermined time T, the processing directly returns to step S208. In step S217, the controller C holds the primary piston 10 at the first control position L1 (time t8), and the processing returns to step S208. In this way, the controller C switches the control position of the primary piston 10 between the first and second control positions L1 and L2.

Next, a fourth embodiment of the present invention will be described with reference to FIGS. 2, 9, and 10. In the following description, like portions will be denoted by like reference numerals as those in the above-described second embodiment, and only different portions will be described in detail. In the present embodiment, the controller C further sets a third control position L3, in addition to the above-described first and second control positions L1 and L2. As shown in FIG. 2(c), the third control position L3 is a position where the primary piston 10 is further moved backward from the hydraulic pressure release position L0 and the second control position L2 shown in FIG. 2(B). When the primary piston 10 is located at this third control position L3, the primary chamber 16 is in communication with the reservoir 5 through the port 24 with a larger flow passage area. The third control position L3 is set as, for example, the position of the primary piston 10 where the central position 240 of the port 24 and the rear end position 22AB of the seal member 22A are aligned. Then, moving back the primary piston 10 to the third control position L3 allows a required amount of brake fluid to be supplied from the reservoir 5 to the primary chamber 16, when the hydraulic pump 74 of the hydraulic controller 70 is driven to supply the brake fluid to the brake caliper 71 of each wheel, for example, to execute vehicle stability control. As a result, it becomes possible to quickly supply the brake fluid from the hydraulic controller 70 to the brake caliper 71, and effectively perform pressurization and pressure increase control by the hydraulic controller 70.

The control flow of the controller C will be described with reference to the flowchart of FIG. 9 and the time chart of FIG. 10. The present embodiment includes steps S313 and S314, in addition to the control flow according to the above-described second embodiment (FIG. 5). Step S313 is inserted between step S108 (step S308 in FIG. 9) and step S110 (step S310 in FIG. 9) in the control flow according to the above-described second embodiment. In step S313, the controller C determines whether the hydraulic pump 74 of the hydraulic controller 70 is operated due to, for example, execution of vehicle stability control. If the hydraulic pump 74 is not operated, the processing proceeds to step S310. If the hydraulic pump 74 is operated, the processing proceeds to step S314. In step S314, the controller C holds the primary piston 10 at the third control position L3, and then the processing returns to step S308. In this way, the controller C switches the control position of the primary piston 10 among the first, second, and third control positions L1, L2, and L3.

Referring to the time chart of FIG. 10, during the period from time t1 to time t5, the controller C performs the same processing as the processing from step S101 to step S108 in the above-described second embodiment (steps S301 to S308). At time t6, the hydraulic pump 74 of the hydraulic controller 70 is driven (YES in step S313), and the primary piston 10 is moved to the third control position L3 (step S314). At time t7, the hydraulic pump 74 of the hydraulic controller 70 is stopped (NO in step S313), and the primary piston 10 is moved to the first control position L1 (NO in step S310). At time t8, a driver presses the accelerator pedal, and the primary piston 10 is moved to the second control position L2 (YES in step S310). It should be noted that the brake pedal is released through time t1 to time t8.

The first to fourth embodiments have been described assuming that the brake apparatus 1 is a brake apparatus provided with the tandem-type master cylinder 2 having the hydraulic ports 18 and 19 of the two systems, by way of example. However, the present invention is not limited thereto, and can be employed to a brake apparatus including a single-type master cylinder without the secondary piston 11 and the secondary chamber 17. Further, in the first to fourth embodiments, the ball and screw mechanism 41 may be replaced with another known rotation-linear motion conversion mechanism. Further, the first to fourth embodiments use an electric motor coaxially disposed with the ball and screw mechanism 41 and the primary piston 10 as the electric motor 40. However, the present invention is not limited thereto, and may use an electric motor having a different axis from the axes of the ball and screw mechanism 41 and the primary piston 10. Further, in the first to fourth embodiments, the electric actuator is constituted by the electric motor 40 and the ball and screw mechanism 41. However, the electric actuator may be embodied by another type of electric actuator such as a hydraulic electric actuator including a hydraulic pump and a cylinder, and a pneumonic electric actuator including a pneumonic differential pressure power casing and an electromagnetic solenoid valve.

Further, the above-described first to fourth embodiments are configured such that both the input piston 32 and the primary piston 10 are inserted through the master cylinder 2 (the input piston 32 is slidably and liquid-tightly inserted through the guide bore 31 of the primary piston 10). However, the input piston may not be inserted through the master cylinder, and the present invention can be carried out as long as a piston to be driven by the actuator is inserted through the master cylinder. Therefore, for example, the control according to the above-described embodiments can be employed to a so-called by-wire-type brake apparatus configured such that a pressing force applied to the brake pedal is not directly transmitted to the master cylinder.

The brake apparatus according to the above-described embodiments includes the reservoir configured to reserve brake fluid, the master cylinder connected to the reservoir and configured to generate a hydraulic pressure in the pressure chamber by cutting off communication between the pressure chamber and the reservoir according to a forward movement of the piston, the booster configured to operate the piston of the master cylinder, the hydraulic pressure detector configured to detect the hydraulic pressure generated in the pressure chamber, and the controller configured to control the booster. The booster includes the input member configured to be moved according to an operation of the brake pedal, the electric actuator configured to drive the piston, and the position detector configured to detect a position of the piston. The controller sets at least two holding positions where the piston is held as the first control position and the second control position based on the reference position. The reference position is set from the position of the piston detected by the position detector when the controller causes the electric actuator to move the piston in the hydraulic pressure generation direction until the hydraulic pressure in the pressure chamber detected by the hydraulic pressure detector reaches the predetermined threshold value. The second control position is set from the position of the piston where the piston is moved back from the reference position in the hydraulic pressure release direction by the predetermined amount to establish the communication between the pressure chamber and the reservoir. The first control position is set from the position of the piston where the piston is moved forward from the second control position in the hydraulic pressure generation direction by the predetermined amount. According to this brake apparatus, it is possible to obtain excellent responsiveness of vehicle braking in response to a brake instruction from a brake pedal operation and a vehicle stability control apparatus.

In the brake apparatus according to the above-described embodiments, the communication between the pressure chamber and the reservoir is narrowed when the piston is located at the first control position more than the communication when the piston is located at the second control position. Alternatively, in the brake apparatus according to the above-described embodiments, the communication between the pressure chamber and the reservoir may be broken when the piston is located at the first control position. According to this brake apparatus, it is possible to obtain further excellent responsiveness of vehicle braking in response to a brake instruction from a brake pedal operation and the vehicle stability control apparatus.

In the brake apparatus according to the above-described embodiments, the controller switches the holding position of the piston when no brake is applied between the first control position and the second control position. Further, in the brake apparatus according to the above-described embodiments, the controller alternately switches the holding position of the piston when no brake is applied between the first control position and the second control position at the predetermined time interval. According to this brake apparatus, it is possible to obtain excellent responsiveness of vehicle braking by switching the holding position of the piston to the first control position before a brake instruction is issued from a brake pedal operation or the vehicle stability control apparatus, and it is also possible to prevent occurrence of a brake drag by switching the holding position of the piston to the second control position to thereby release the hydraulic pressure in the pressure chamber to the reservoir. Further, it is possible to more reliably obtain the above-mentioned effects by switching the holding position of the piston to the first control position and the second control position at the predetermined interval.

In the brake apparatus according to the above-described embodiments, the controller sets the holding position of the piston to the first control position, before a brake pedal operation is started. According to this brake apparatus, it is possible to obtain excellent responsiveness of vehicle braking in response to a brake pedal operation by moving the holding position of the piston to the first control position before the brake pedal operation is started.

In the brake apparatus according to the above-described embodiments, the controller sets the holding position of the piston when no brake is applied to the first control position, when an accelerator pedal is not operated. According to this brake apparatus, it is possible to obtain excellent responsiveness of vehicle braking in response to a brake pedal operation by estimating that the brake pedal operation is about to be started from the fact that the accelerator pedal is not operated, and therefore moving the holding position of the piston to the first control position.

In the brake apparatus according to the above-described embodiments, the controller sets the holding position of the piston to the second control position when an operation of the brake pedal is released. According to this brake apparatus, it is possible to prevent occurrence of a brake drag by releasing, to the reservoir, the hydraulic pressure in the pressure chamber of the master cylinder including the brake fluid returned from the wheel cylinder due to the release of the brake pedal operation.

In the brake apparatus according to the above-described embodiments, the controller sets the holding position of the piston when no brake is applied to the second control position, when the accelerator pedal is operated. According to this brake apparatus, it is possible to prevent occurrence of a brake drag by releasing the hydraulic pressure in the pressure chamber of the master cylinder when the accelerator pedal is operated.

The brake apparatus according to the fourth embodiment includes the hydraulic supply apparatus disposed between the brake mechanism configured to generate a brake force by a supply of the brake fluid, and the pressure chamber and configured to supply the brake fluid from the pressure chamber to the brake apparatus by the hydraulic pump. In a brake release state, when the hydraulic pump is operated, the controller holds the piston at the third control position where the piston is moved back relative to the second control position for enlarging the flow passage between the pressure chamber and the reservoir. According to this brake apparatus, it is possible to quickly supply the brake fluid from the hydraulic supply apparatus to the brake caliper, and thereby possible to effectively perform pressurization and pressure increase control by the hydraulic supply apparatus.

The brake apparatus according to the above-described embodiment can obtain excellent responsiveness of vehicle braking in response to a brake instruction.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Applications No. 2010-218921 filed on Sep. 29, 2010. The entire disclosure of Japanese Patent Applications No. 2010-218921 filed on Sep. 29, 2010, including specification, claims, drawings and summary is incorporated herein by reference in its entirety.

What is claimed is:

1. A brake apparatus comprising:
  a reservoir configured to reserve brake fluid;
  a master cylinder in communication with the reservoir, the master cylinder being configured to generate a hydraulic pressure in a pressure chamber by cutting off communication between the pressure chamber and the reservoir according to a forward movement of a piston of the master cylinder;
  a booster configured to operate the piston;
  a hydraulic pressure detector configured to detect the hydraulic pressure generated in the pressure chamber; and
  a controller configured to control the booster,
  wherein the booster includes an input member configured to be moved according to an operation of a brake pedal, an electric actuator configured to drive the piston, and a position detector configured to detect a position of the piston,
  wherein the controller is configured to set at least two holding positions of the piston such that the piston is held at a first control original position and a second control original position based on a reference position by the electric actuator,
  wherein the controller is configured to set the reference position from a position of the piston detected by the position detector in a state in which the controller causes the electric actuator to move the piston in a hydraulic pressure generation direction until the hydraulic pressure generated in the pressure chamber detected by the hydraulic pressure detector reaches a predetermined threshold value,
  wherein the controller is configured to set the second control original position corresponding to a position of the piston in a state in which the piston is moved back from the reference position in a hydraulic pressure release direction by a first predetermined amount so as to establish the communication between the pressure chamber and the reservoir,
  wherein the controller is configured to set the first control original position corresponding to a position of the piston in a state in which the piston is moved forward from the second control original position in the hydraulic pressure generation direction by a second predetermined amount, the second predetermined amount being different from the first predetermined amount, and
  wherein the controller is configured to set the first control original position and the second control original position in a state in which the brake pedal is not operated.

2. The brake apparatus according to claim 1, wherein a communication area between the pressure chamber and the reservoir is narrower in a state in which the piston is located at the first control original position than in a state in which the piston is located at the second control original position.

3. The brake apparatus according to claim 2, wherein the communication between the pressure chamber and the reservoir is cut off in the state in which the piston is located at the first control original position.

4. The brake apparatus according to claim 1, wherein the controller is configured to change the at least two holding positions of the piston in the state in which the brake pedal is not operated between the first control original position and the second control original position.

5. The brake apparatus according to claim 4, wherein the controller is configured to change the at least two holding positions of the piston in the state in which the brake pedal is not operated, alternately between the first control original position and the second control original position at a predetermined time interval.

6. The brake apparatus according to claim 4, wherein the controller is configured to set one of the at least two holding positions of the piston to the first control original position, before a brake pedal operation is started.

7. The brake apparatus according to claim 4, wherein the controller is configured to set one of the at least two holding positions of the piston in the state in which the brake pedal is not operated to the first control original position, in a state in which an accelerator pedal is not operated.

8. The brake apparatus according to claim 4, wherein the controller is configured to set one of the at least two holding positions of the piston to the second control original position in a state in which the brake pedal is released.

9. The brake apparatus according to claim 4, wherein the controller is configured to set one of the at least two holding positions of the piston in the state in which the brake pedal is not operated to the second control original position, in a state in which an accelerator pedal is operated.

10. The brake apparatus according to claim 1, further comprising:
  a hydraulic pressure supply unit disposed between a wheel cylinder and the pressure chamber of the master cylinder, the hydraulic pressure supply unit comprising a hydraulic pump and being configured to supply the brake fluid from the pressure chamber to the wheel cylinder by the hydraulic pump,
  wherein the controller is configured to hold the piston at a third control original position by the electric actuator in a state in which the hydraulic pump is operated and the brake pedal is not operated, the third control original position being a position of the piston in which the piston is moved back further relative to the second control original position so as to enlarge a flow passage of the communication between the pressure chamber and the reservoir.

11. A brake apparatus comprising:
  a master cylinder in communication with a reservoir configured to reserve brake fluid, the master cylinder being configured to generate a hydraulic pressure in a pressure chamber by cutting off communication between the pressure chamber and the reservoir according a forward movement of a piston of the master cylinder;

a booster configured to operate the piston by an electric actuator according to a movement of an input member moved by an operation of a brake pedal;

a controller configured to control the electric actuator in response to the operation of the brake pedal;

a hydraulic pressure detector configured to detect the hydraulic pressure generated in the pressure chamber;

a position detector configured to detect a position of the piston, wherein the controller is configured to control the electric actuator even independently of the operation of the brake pedal, and wherein the controller is configured to set one of a first control original position and a second control original position as a holding position of the piston in a state in which the brake pedal is not operated, the first control original position being a position of the piston in which the communication between the pressure chamber and the reservoir is cut off, and the second control original position being a position of the piston in which the communication between the pressure chamber and the reservoir is established, and wherein the controller is configured to change the holding position of the piston in a state in which the brake pedal is not operated, between the first control original position and the second control original position.

12. The brake apparatus according to claim 11, wherein the controller is configured to change the holding position of the piston in the state in which the brake pedal is not operated, alternately between the first control original position and the second control original position at a predetermined time interval.

13. The brake apparatus according to claim 11, wherein the controller is configured to set the holding position of the piston to the first control original position, before a brake pedal operation is started.

14. The brake apparatus according to claim 11, wherein the controller is configured to set the holding position of the piston in the state in which the brake pedal is not operated to the first control original position, in a state in which an accelerator pedal is not operated.

15. The brake apparatus according to claim 11, wherein the controller is configured to set the holding position of the piston to the second control original position in a state in which the brake pedal is released.

16. The brake apparatus according to claim 11, wherein the controller is configured to set the holding position of the piston in the state in which the brake pedal is not operated to the second control original position, in a state in which an accelerator pedal is operated.

17. The brake apparatus according to claim 11, wherein the controller is configured to set a third control original position which is a position of the piston in which a flow passage of the communication between the pressure chamber and the reservoir is enlarged compared to a state in which the piston is held at the second control original position.

18. The brake apparatus according to claim 17, further comprising a hydraulic control unit disposed between a wheel cylinder, to which the master cylinder is configured to supply a hydraulic pressure, and the master cylinder, the hydraulic control unit comprising a hydraulic pump and being configured to supply a hydraulic pressure to the wheel cylinder by the hydraulic pump without the aid of the hydraulic pressure in the master cylinder, and wherein the controller is configured to set the holding position of the piston to the third control original position in a state in which the hydraulic control unit is operated.

19. A brake apparatus comprising:

a master cylinder in communication with a reservoir configured to reserve brake fluid, the master cylinder being configured to generate a hydraulic pressure in a pressure chamber by cutting off communication between the pressure chamber and the reservoir according to a forward movement of a piston of the master cylinder;

a booster configured to operate the piston by an electric actuator according to a movement of an input member moved by an operation of a brake pedal;

a controller configured to control the electric actuator in response to the operation of the brake pedal;

wherein the controller is configured to receive detection signals from a hydraulic pressure detector configured to detect the hydraulic pressure generated in the pressure chamber and a position detector configured to detect a position of the piston, wherein the controller is configured to control the electric actuator independently of the operation of the brake pedal, wherein the controller is configured to set one of a hydraulic pressure generation position and a hydraulic pressure release position as a holding position of the piston in a state in which the brake pedal is not operated, the hydraulic pressure generation position being a position of the piston in which the communication between the pressure chamber and the reservoir is cut off, and the hydraulic pressure release position being a position of the piston in which the communication between the pressure chamber and the reservoir is established, and wherein the controller is configured to set the holding position of the piston to the hydraulic pressure release position immediately after the operation of the brake pedal is finished, and the controller is configured to change the holding position of the piston to the hydraulic pressure generation position after a predetermined time has passed.

20. The brake apparatus according to claim 19, wherein the controller is configured to change the holding position of the piston in the state in which the brake pedal is not operated, alternately between the hydraulic pressure generation position and the hydraulic pressure release position at a predetermined time interval.

* * * * *